United States Patent
Hada (10) Patent No.: US 11,117,207 B2
(45) Date of Patent: Sep. 14, 2021

(54) WIRE ELECTRICAL DISCHARGE MACHINE

(71) Applicant: FANUC CORPORATION, Yamanashi (JP)

(72) Inventor: Keita Hada, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 349 days.

(21) Appl. No.: 15/642,432

(22) Filed: Jul. 6, 2017

(65) Prior Publication Data
US 2018/0015556 A1    Jan. 18, 2018

(30) Foreign Application Priority Data
Jul. 13, 2016    (JP) .............................. JP2016-138146

(51) Int. Cl.
    *B23H 7/10*      (2006.01)
(52) U.S. Cl.
     CPC ............... *B23H 7/10* (2013.01); *B23H 7/102* (2013.01); *B23H 7/105* (2013.01)
(58) Field of Classification Search
     CPC ........... B23H 7/10; B23H 7/105; B23H 7/102
     USPC .................................... 219/69.2, 69.11, 69.12
     See application file for complete search history.

(56) References Cited

U.S. PATENT DOCUMENTS

| 4,629,856 | A | 12/1986 | Inoue | |
| 2015/0231716 | A1* | 8/2015 | Yamazaki | B23H 7/10 219/69.12 |
| 2016/0023291 | A1 | 1/2016 | Inoue | |

FOREIGN PATENT DOCUMENTS

| CN | 1374898 A | 10/2002 |
| CN | 103442836 A | 12/2013 |
| CN | 103974795 A | 8/2014 |
| CN | 104023891 A | 9/2014 |
| JP | S62-130129 A | 6/1987 |
| JP | H7-51607 A | 2/1995 |
| JP | 2002-28826 A | 1/2002 |
| JP | 2004-122260 A | 4/2004 |
| JP | 2006-231417 A | 9/2006 |
| JP | 2008-12644 A | 1/2008 |
| JP | 2013-129048 A | 7/2013 |

(Continued)

OTHER PUBLICATIONS

Extended European Search Report in EP Application No. 17001170.4, dated Nov. 13, 2017, 5 pp.

*Primary Examiner* — Tu B Hoang
*Assistant Examiner* — Alba T Rosario-Aponte
(74) *Attorney, Agent, or Firm* — Hauptman Ham, LLP (57) ABSTRACT

A wire electrical discharge machine includes a guide pipe arranged in a path along which a wire electrode is fed from a feed roller to a workpiece, and formed with an insertion hole through which the wire electrode is inserted, a compressed air supply device configured to supply compressed air to the insertion hole so that compressed air flows through the insertion hole along a feed direction of the wire electrode, a database configured to store data indicative of a relationship between rigidity information of the wire electrode and pressure information of compressed air, and a controller configured to set pressure of the compressed air supplied to the insertion hole, based on the rigidity information of the wire electrode fed to the workpiece and the data.

3 Claims, 3 Drawing Sheets

(56) References Cited

FOREIGN PATENT DOCUMENTS

JP 5414660 B2 2/2014

\* cited by examiner

WIRE ELECTRICAL DISCHARGE MACHINE

CROSS-REFERENCE TO RELATED APPLICATION

This application is based upon and claims the benefit of priority from Japanese Patent Application No. 2016-138146 filed on Jul. 13, 2016, the contents of which are incorporated herein by reference.

BACKGROUND OF THE INVENTION

Field of the Invention

The present invention relates to a wire electrical discharge machine having an auto wire feeding function for automatically feeding a wire electrode.

Description of the Related Art

Generally, a wire electrical discharge machine has an auto wire feeding function of automatically inserting a wire electrode into a start hole formed in a workpiece or a machining groove formed by wire electrical discharge machining to perform wire feeding. For this purpose, a guide pipe (guide member) for straightly feeding the wire electrode into the machining start hole or the machining groove is provided.

However, when the wire electrode is inserted through an insertion hole formed inside the guide member, there may occur cases where the tip of the wire electrode is caught on an inner wall of the guide member or caught by other objects, hence the wire electrode is bent (or undergoes a deflection), and resultantly auto wire feeding fails.

To deal with such situations, Japanese Patent No. 5414660 discloses that, at the time of auto wire feeding, compressed air is delivered into the insertion hole of the guide member so that the wire electrode can be fed straight into the guide member.

SUMMARY OF THE INVENTION

When a highly rigid wire electrode is used, since the weight of the wire electrode is heavy, the wire electrode can be fed straight even with compressed air at a relatively small pressure. On the other hand, in order to feed a wire electrode having a low rigidity straightly into the guide member, it is necessary to increase the pressure of the compressed air supplied to the interior of the guide member. Since a high capacity compressor is needed in order to supply highly compressed air, increased noise is given off.

In order to enable auto wire feeding of multiple types of wire electrodes having different rigidity, a compressor adapted to the wire electrode with the lowest rigidity is required. Therefore, when a highly rigid wire electrode is automatically fed, the generated noise is unnecessarily increased.

It is therefore an object of the present invention to provide a wire electrical discharge machine capable of automatically feeding multiple types of wire electrodes having different rigidity while reducing noise during auto wire feeding.

According to an aspect of the present invention, a wire electrical discharge machine includes a feed roller configured to feed a wire electrode downward to a workpiece, a winding roller configured to wind up the wire electrode having passed through the workpiece, a guide member arranged in a path along which the wire electrode is fed from the feed roller to the workpiece, and formed with an insertion hole through which the wire electrode is inserted; a compressed air supply device configured to supply compressed air to the insertion hole so that the compressed air flows through the insertion hole along a feed direction of the wire electrode, a storage medium configured to store data indicative of a relationship between rigidity information of the wire electrode and pressure information of the compressed air, and a controller configured to set pressure of the compressed air supplied to the insertion hole based on the rigidity information of the wire electrode fed to the workpiece and the data.

With this configuration, it is possible to supply compressed air at an appropriate pressure for the rigidity of the wire electrode to the insertion hole of the guide member. Thus, it is possible to suppress generation of excessively large noise during auto wire feeding. Accordingly, it is possible to suppress generation of noise from the compressed air supply device during at the time of auto wire feeding. Further, since compressed air of an appropriate pressure is supplied to the insertion hole, the electrode wire can be fed straight downward, thereby preventing the wire electrode fed to the workpiece from being bent (or undergoing deflection). Owing thereto, it is possible to reliably perform auto wire feeding.

In the aspect of the present invention, the wire electrical discharge machine may further include a pressure regulating valve arranged in a supply pipe configured to connect the insertion hole with the compressed air supply device, the pressure regulating valve being configured to regulate the pressure of the compressed air supplied from the compressed air supply device to the insertion hole, and the controller may adjust a diaphragm opening of the pressure regulating valve based on the rigidity information of the wire electrode fed to the workpiece and the data to thereby set the pressure of the compressed air supplied to the insertion hole. With this configuration, the pressure regulating valve regulates the pressure of the compressed air supplied to the insertion hole, and thus it is possible to reduce noise arising from the compressed air supply device at the time of auto wire feeding.

In the wire electrical discharge machine according to the aspect of the present invention, the compressed air supply device may include a plurality of compressed air supply devices configured to supply the compressed air having pressures different from each other. Further, the wire electrical discharge machine may further include a switching valve arranged in a supply pipe configured to connect the compressed air supply devices with the insertion hole, the switching valve being configured to switch between the compressed air supply devices for supplying the compressed air to the insertion hole. Still further, the controller may controls the switching valve based on the rigidity information of the wire electrode fed to the workpiece and the data, to thereby set the pressure of the compressed air supplied to the insertion hole, put one of the compressed air supply devices that supplies the compressed air to the insertion hole, into an operating state, and put the other compressed air supply devices that will not supply the compressed air to the insertion hole, into a non-operating state. In this way, since the compressed air supply device that generates compressed air of an appropriate pressure for the rigidity of the wire electrode is placed in an operating state so as to supply the compressed air to the insertion hole, it is possible to suppress generation of excessively large noise during auto wire feeding. Thus, it is possible to suppress noise generated by the compressed air supply device at the time of auto wire feeding.

In the wire electrical discharge machine according to the aspect of the present invention, in a case that the controller determines that auto wire feeding of the wire electrode has failed, the controller changes the setting so that the pressure of the compressed air supplied to the insertion hole becomes higher. Owing thereto, the pressure of compressed air supplied to the insertion hole can be changed to an appropriate pressure for the rigidity of the wire electrode actually used, thereby leading to reliable auto wire feeding.

In the aspect of the present invention, the wire electrical discharge machine may further include a deflection detector configured to detect deflection of the fed wire electrode, and in a case that deflection is detected by the deflection detector at the time of auto wire feeding of the wire electrode, the controller may determine that the auto wire feeding of the wire electrode has failed. With the structure, it is possible to reliably determine whether the auto wire feeding has succeeded or failed.

In the aspect of the present invention, the wire electrical discharge machine may further include a tension detector configured to detect the tension of the wire electrode fed toward the workpiece, and in the case that the tension detector does not detect a tension equal to or greater than a threshold at the time of auto wire feeding of the wire electrode, the controller may determine that the auto wire feeding of the wire electrode has failed. With the structure, it is possible to reliably determine whether the auto wire feeding has succeeded or failed.

In the wire electrical discharge machine according to the aspect of the present invention, in the case that auto wire feeding has succeeded by changing the setting of the pressure of the compressed air, the controller may update the data stored in the storage medium, based on the pressure information for which the auto wire feeding has succeeded. By performing learning in the above way, it is possible to suppress failure of auto wire feeding.

According to the present invention, since compressed air can be supplied at an appropriate pressure for the rigidity of the wire electrode, it is possible to suppress generation of excessively large noise during auto wire feeding. Accordingly, it is possible to suppress generation of noise from the compressed air supply device during at the time of auto wire feeding. Further, since compressed air of an appropriate pressure is supplied to the insertion hole, the electrode wire can be fed straight downward, and bending of the wire electrode fed to the workpiece is prevented. Thus, auto wire feeding can be performed reliably.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Preferred embodiments of a wire electrical discharge machine according to the present invention will be described in detail with reference to the accompanying drawings.

Figure 1:
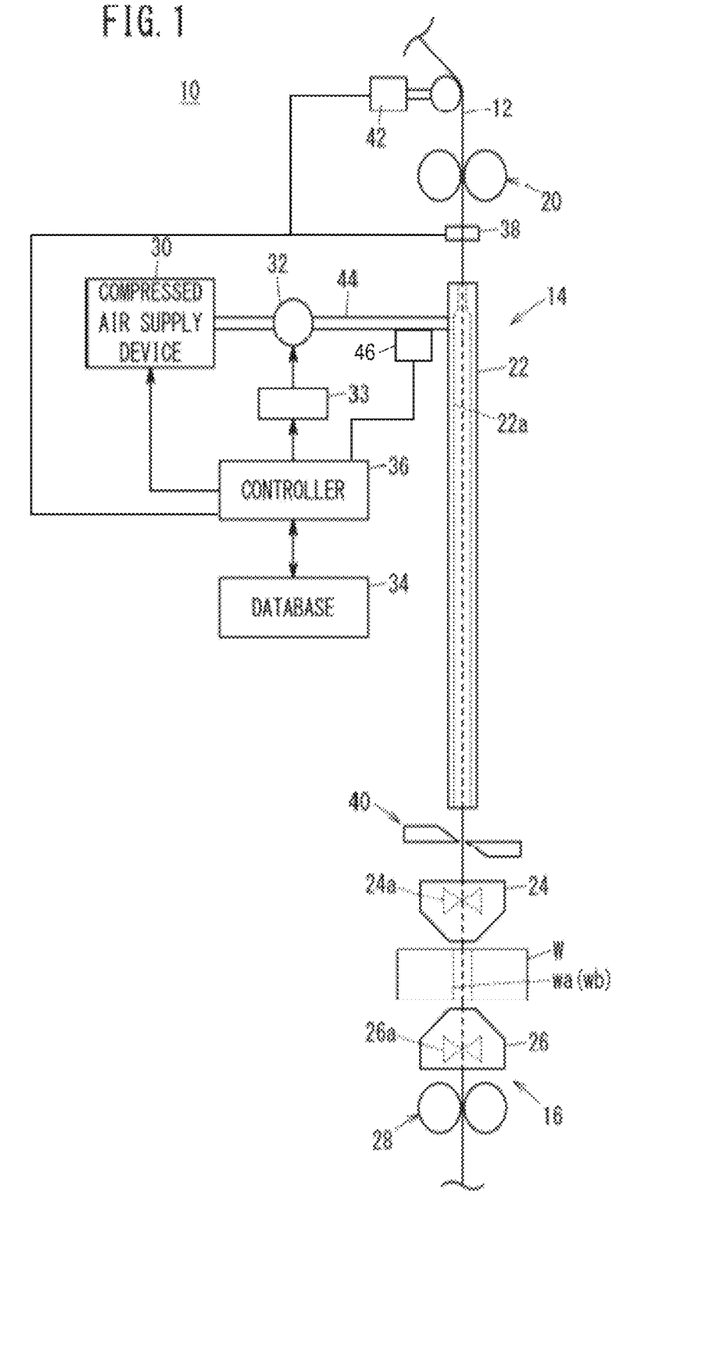
FIG. 1 is a diagram showing a configuration of main components of a wire electrical discharge machine according to an embodiment of the present invention.

FIG. 1 is a diagram showing a configuration of main components of a wire electrical discharge machine 10 according to an embodiment of the present invention. The wire electrical discharge machine 10 is a machine tool for machining a workpiece by electrical discharge generated between a wire electrode 12 and a workpiece W via a dielectric working fluid (not shown). The workpiece W is supported by a table (not shown). The wire electrode 12 is made of, for example, metal material such as tungsten-based, copper-alloy-based and brass-based material. On the other hand, the material forming the workpiece W is, for example, metal material such as iron-based material, super-hard material (tungsten carbide, etc.) and the like.

The wire electrical discharge machine 10 has a feed system 14 for feeding a fresh wire electrode 12 to the workpiece W and a collecting system 16 for collecting the wire electrode 12 fed to the workpiece W and consumed by machining. This configuration enables preferable machining. The feed system 14 feeds the wire electrode 12 to the workpiece W vertically downward (in the direction of gravity) while the collecting system 16 collects the wire electrode 12 passed downward through the workpiece W. The wire electrode 12 fed by the feed system 14 passes through a start hole wa of the workpiece W or a machining groove wb formed by wire electrical discharge machining, and then is collected by the collecting system 16.

The feed system 14 is arranged above the workpiece W. The feed system 14, at least, includes a wire bobbin (not shown) on which the wire electrode 12 is wound, a feed roller 20, a guide pipe (pipe) 22, and an upper wire guide (upper nozzle) 24, which are arranged in the above order from the upstream side of the feed direction of the wire electrode 12.

The feed roller 20 is a roller for feeding the wire electrode 12 supplied from the wire bobbin, downward to the workpiece W. The feed roller 20 is rotated by a torque given from an unillustrated rotational drive source (a motor, a speed reduction mechanism, etc.). The guide pipe (guide member) 22 guides the wire electrode 12 fed from the feed roller 20, downward (in the direction of gravity) to the workpiece W, and is a hollow pipe through which the wire electrode 12 passes. That is, the guide pipe 22 has an insertion hole 22a formed in a downward direction (the axial direction of the guide pipe 22) to pass the wire electrode 12 therethrough. The upper wire guide 24 guides the wire electrode 12 that goes toward the workpiece W through the insertion hole 22a of the guide pipe 22. The upper wire guide 24 has an upper die guide 24a. The upper die guide 24a positions the wire electrode 12 to be fed to the workpiece W in the vicinity of the upper side of the workpiece W.

The collecting system 16 is provided below the workpiece W. The collecting system 16, at least, includes a lower wire guide (lower nozzle) 26, a winding roller 28, and a bucket (not shown) for collecting the used wire electrode 12, which are arranged in the above order from the upstream side in the feed direction of the wire electrode 12.

The lower wire guide 26 guides the wire electrode 12 that goes toward the winding roller 28 through the start hole wa or machining groove wb of the workpiece W. The lower wire guide 26 has a lower die guide 26a. The lower die guide 26a positions the wire electrode 12 having passed through the workpiece W in the vicinity of the lower side the workpiece W. The upper die guide 24a together with the lower die guide 26a support the wire electrode 12. The winding roller 28 is arranged below the lower wire guide 26, and is a roller for winding up the used wire electrode 12. The wire electrode 12 wound up by the winding roller 28 is collected by the aforementioned bucket. The winding roller 28 is rotated by a torque given from an unillustrated rotational drive source (a motor, a speed reduction mechanism, etc.). A predetermined tension is applied to the wire electrode 12 by the feed roller 20 and the winding roller 28.

The feed roller 20, the guide pipe 22, the upper wire guide 24, the lower wire guide 26, and the winding roller 28 are arranged on a straight line vertically from top to bottom (in the direction of gravity). Accordingly, the wire electrode 12 which is fed from the feed roller 20 and taken up by the winding roller 28 is fed downward in the vertical direction.

It should be noted that the direction of rotation of the feed roller 20 and the winding roller 28 when the wire electrode 12 is fed downward is defined as a normal direction, whereas the direction of rotation of the feed roller 20 and the winding roller 28 when the wire electrode 12 is rewound (backward fed) in the upward direction is defined as a reverse direction.

The wire electrical discharge machine 10 further includes a compressed air supply device 30, a pressure regulating valve 32, a database 34, a controller 36, a deflection detector 38, a wire cutting device 40, and a tension detector 42. The compressed air supply device 30 has an air compressor, generates compressed air and supplies the generated compressed air to the interior (insertion hole 22a) of the guide pipe 22. The compressed air supply device 30 generates compressed air having a predetermined pressure. The compressed air supply device 30 and the interior (insertion hole 22a) of the guide pipe 22 are connected via a supply pipe 44. The compressed air generated by the compressed air supply device 30 is supplied to the insertion hole 22a of the guide pipe 22 through the supply pipe 44. The compressed air supplied to the insertion hole 22a of the guide pipe 22 flows downward along the guide pipe 22.

In order to allow the compressed air supplied to the insertion hole 22a of the guide pipe 22 to flow downward, a gap (clearance) between an inner wall of the guide pipe 22 (the inner wall forming the insertion hole 22a) located above the connected position of the supply pipe 44 and the wire electrode 12 is set to be small. In other words, the inner diameter of the insertion hole 22a of the guide pipe 22 located above the connected position of the supply pipe 44 is set to be small such that compressed air will not escape from above. On the other hand, the inner diameter of the insertion hole 22a of the guide pipe 22 located below the connected position of the supply pipe 44 is set at a diameter that allows compressed air to flow therethrough, and is greater than the inner diameter of the insertion hole 22a located above the connected position of the supply pipe 44.

The pressure regulating valve 32 is provided on the supply pipe 44 and regulates the pressure of the compressed air supplied from the compressed air supply device 30 to the insertion hole 22a of the guide pipe 22. This pressure regulating valve 32 is driven by an actuator 33 under the control of the controller 36 so that the diaphragm opening is adjusted.

The minimal compressed air pressure (pressure of compressed air supplied into the guide pipe 22) required to feed the wire electrode 12 straight downward varies depending on the rigidity of the wire electrode 12. Therefore, in the database (storage medium) 34, there is stored data indicative of the relationship between information on rigidity of the wire electrode 12 (hereinafter referred to as rigidity information) and information on pressure of compressed air (hereinafter referred to as pressure information). This data may be, for example, a table in which the rigidity information of multiple kinds of wire electrodes 12 of different rigidity is associated with the pressure information of the compressed air, or a graph that represents the relationship between the rigidity information of the wire electrode 12 and the pressure information of the compressed air. Examples of the pressure information may include the pressure value, the diaphragm opening value. The pressure information stored in the database 34 is set such that the lower the rigidity of the wire electrode 12 is, the higher the pressure of the compressed air supplied to the insertion hole 22a becomes.

The controller 36 includes a processor such as a CPU and a memory having a program stored therein. This processor runs the program stored in the memory to function as the controller 36 of the present embodiment. The controller 36 is a computer that controls diverse components of the wire electrical discharge machine 10 (such as the feed roller 20, the motor for rotating the winding roller 28, the compressed air supply device 30, the pressure regulating valve 32, etc.).

At the time of auto wire feeding of the wire electrode 12, the controller 36 sets the pressure of the compressed air to be supplied to the insertion hole 22a of the guide pipe 22, based on the rigidity information of the wire electrode 12 to be used and the data stored in the database 34. More specifically, when the pressure information of the compressed air indicates the pressure value, the controller 36 reads, from the database 34, the pressure value of the compressed air corresponding to the rigidity information of the wire electrode 12 to be used. The controller 36 then adjusts the diaphragm opening by controlling the pressure regulating valve 32 via the actuator 33 so that the pressure of the compressed air supplied to the insertion hole 22a of the guide pipe 22 has the pressure value read out from the database 34. Thus, the pressure of the compressed air supplied to the insertion hole 22a of the guide pipe 22 is set.

Here, a pressure sensor 46 for detecting the pressure of the compressed air supplied to the insertion hole 22a may be provided in the supply pipe 44 or the insertion hole 22a, whereby the controller 36 can perform feed-back control on the diaphragm opening of the pressure regulating valve 32 based on the detection result from the pressure sensor 46.

When the compressed air pressure information indicates the value of diaphragm opening, the controller 36 reads, from the database 34, the value of diaphragm opening corresponding to the rigidity information of the wire electrode 12 to be used. Then, the controller 36 controls the pressure regulating valve 32 via the actuator 33 so that the diaphragm opening of the pressure regulating valve 32 becomes the read value of diaphragm opening.

The controller 36 drives the compressed air supply device 30 into an operating state before auto wire feeding of the wire electrode 12. Thus, compressed air can be supplied to the insertion hole 22a at the time of auto wire feeding of the wire electrode 12. Further, the controller 36 puts the compressed air supply device 30 into a non-operating state on completion of the auto wire feeding.

It should be noted that the controller 36 may keep the compressed air supply device 30 in an operating state even at times other than auto wire feeding of the wire electrode 12. Further, operating and non-operating of the compressed air supply device 30 may be manually switched, instead of the controller 36. For example, an operator may switch between the operating state and the non-operating state by turning on/off a button provided on the compressed air supply device 30. The compressed air supply device 30 generates compressed air in an operating state, and does not generate compressed air in a non-operating state.

The rigidity information of the wire electrode 12 to be used is input by an operator. That is, the operator operates an unillustrated input device such as a keyboard, a mouse or a touch panel provided in the controller 36, so that the controller 36 can acquire the rigidity information of the wire electrode 12 to be used. The operator may directly input the rigidity of the wire electrode 12 or may input information indicating the rigidity such as the material, diameter, etc. of the wire electrode 12.

The deflection detector 38 is arranged between the feed roller 20 and the guide pipe 22, and detects deflection (bending) of the wire electrode 12. The detection result from the deflection detector 38 is output to the controller 36. The wire cutting device 40 is arranged, for example between the guide pipe 22 and the upper wire guide 24, and cuts the wire electrode 12. Although FIG. 1 illustrates an example where the wire cutting device 40 cuts the wire electrode 12 using a cutter, the invention is not limited thereto. For example, the wire cutting device 40 may cut the wire electrode 12 by using a technique of annealing a portion of the wire electrode 12 to be cut by applying electric current thereto for heating, then applying a torque to the wire electrode 12 to cut the annealed portion.

The tension detector 42 is arranged upstream of the feed roller 20 and detects the tension of the fed wire electrode 12. The result detected by the tension detector 42 is output to the controller 36. The installation positions of the deflection detector 38 and the tension detector 42 are not limited to those shown in FIG. 1.

Based on the detection result of the deflection detector 38 and the detection result of the tension detector 42, the controller 36 determines whether the auto wire feeding has succeeded or failed. If deflection of the wire electrode 12 is detected by the deflection detector 38 at the time of auto wire feeding, then the controller 36 determines that auto wire feeding of the wire electrode 12 has failed. Further, if the tension detector 42 does not detect a tension of the wire electrode 12 that is equal to or greater than a threshold (i.e., the detected tension is lower than the threshold) at the time of auto wire feeding, then the controller 36 determines that the auto wire feeding of the wire electrode 12 has failed.

For example, when deflection equal to or greater than a threshold is detected at the time of auto wire feeding, and when a tension equal to or greater than the threshold is not detected, the wire electrode 12 is judged as being bent (or undergoing a deflection). The cause of deflection of the wire electrode 12 is, for example, that the wire electrode 12 is caught on the inner wall of the guide pipe 22 or that the wire electrode 12 does not pass through the start hole wa or the machining groove wb of the workpiece W, and the tip of the wire electrode 12 abuts against the workpiece W.

Here, "the time of auto wire feeding" indicates a period of time from the time at which the feed roller 20 starts feeding the wire electrode 12 downward in order to start the auto wire feeding of the wire electrode 12 until the wire electrode 12 is fed by a first predetermined length. The first predetermined length is, for example, the distance from the feed roller 20 to the winding roller 28. That is, if a deflection is detected by the deflection detector 38 before the wire electrode 12 is fed by the first predetermined length, then the controller 36 determines that the auto wire feeding has failed. Further, even when the wire electrode 12 is fed by the first predetermined length, if the tension detector 42 does not detect a tension equal to or greater than the threshold, then the controller 36 determines that the auto wire feeding has failed. This is because, when the auto wire feeding is successfully done, the wire electrode 12 is fed downward by at least the first predetermined length while being wound up by the winding roller 28 so that a predetermined tension is generated in the wire electrode 12.

Here, description on auto wire feeding will be given briefly. An example will be described in which the wire electrode 12 is fed again after the wire electrode 12 has been broken (in the case of auto wire feeding at wire breakage). When the wire electrode 12 has been broken during wire electrical discharge machining, the tip (broken portion) of the wire electrode 12 is roughened. To deal with this, the wire electrical discharge machine 10 cuts the tip of the wire electrode by the wire cutting device 40. Then, the wire electrode 12 is fed downward by the feed roller 20. At this time, compressed air is supplied to the insertion hole 22a of the guide pipe 22 by the compressed air supply device 30. As a result, the wire electrode 12 can be fed straight downward and can be passed through the machining groove wb of the workpiece W. Further, even when the wire electrode 12 is caught on an object such as the inner wall of the guide pipe 22, such catching is eliminated by the compressed air of an appropriate pressure so that the wire electrode 12 is fed downward while extending straight downward.

In the case where the wire electrode 12 is passed through the start hole wa of the workpiece W (in the case of auto wire feeding at the start of machining), the wire electrode 12 is fed downward by the feed roller 20, and inserted into the insertion hole 22a of the guide pipe 22. Also at this time, the compressed air supply device 30 supplies compressed air to the insertion hole 22a of the guide pipe 22. As a result, the wire electrode 12 can be fed straight downward and can be passed through the start hole wa of the workpiece W. Even when the wire electrode 12 is caught by an object such as the inner wall of the guide pipe 22, for example, such catching is eliminated by the compressed air of an appropriate pressure so that the wire electrode 12 can extend straight downward.

The wire electrode 12 having passed through the machining groove wb (or the start hole wa) of the workpiece W is fed to the winding roller 28. Thus, auto wire feeding is completed.

Next, the operation of the wire electrical discharge machine 10 at the time of auto wire feeding will be described with reference to the flowchart shown in FIG. 2. Here, it is assumed that the compressed air supply device 30 is in an operating state and supplies compressed air to the insertion hole 22a of the guide pipe 22.

The controller 36 acquires the rigidity information of the wire electrode 12 input by the operator (Step S1). Then, the controller 36, based on the rigidity information acquired at Step S1, acquires pressure information on the compressed air from the database 34 (Step S2).

If pressure information corresponding to the rigidity information acquired at Step S1 is not stored in the database 34, arbitrary pressure information may be acquired. The arbitrary pressure information may be predetermined pressure information (reference pressure information) stored in the database 34, or may be pressure information corresponding to rigidity information closest to that acquired at Step S1, in the data stored in database 34.

Next, the controller 36 sets the pressure of the compressed air to be supplied into the guide pipe 22 based on the acquired pressure information (Step S3). Specifically, the controller 36, based on the acquired pressure information, adjusts the diaphragm opening by controlling the pressure regulating valve 32 via the actuator 33. As a result, the pressure of the compressed air to be supplied into the guide pipe 22 (the insertion hole 22a) is set to an appropriate pressure for the rigidity of the wire electrode 12.

Subsequently, the controller 36 controls the rotation drive to rotate the feed roller 20 and the winding roller 28 in the normal direction, thereby starting the feeding of the wire electrode 12 (Step S4).

Next, the controller 36 determines whether or not the auto wire feeding has been successfully done (Step S5). More specifically, if deflection is not detected by the deflection detector 38 until the wire electrode 12 is fed by the first predetermined length, and a tension equal to or greater than the threshold is detected by the tension detector 42, then it is determined that the auto wire feeding has succeeded. In a case where the wire electrode 12 is rewound (backward fed) at Step S6 to be described later, if the deflection detector 38 does not detect deflection until the wire electrode 12 is fed by the length corresponding to the rewound part (second predetermined length), and the tension detector 42 detects a tension equal to or greater than the threshold, then it is determined that the auto wire feeding has succeeded.

If it is determined at Step S5 that the auto wire feeding has failed, then the controller 36 feeds the wire electrode 12 backward (Step S6). That is, by rotating the feed roller 20 in the reverse direction, the wire electrode 12 is fed upward (rewound). The length (second predetermined length) of the wire electrode 12 to be rewound may be the same length as the above-mentioned first predetermined length, or may be a length different from the first predetermined length (the first predetermined length>the second predetermined length, or the first predetermined length<the second predetermined length).

Next, the controller 36 changes the setting of the pressure of the compressed air to be supplied into the guide pipe 22 (Step S7), and returns control to Step S4. The controller 36 controls the actuator 33 to change the diaphragm opening of the pressure regulating valve 32, and thereby changes the setting of the pressure of the compressed air. More specifically, the diaphragm opening of the pressure regulating valve 32 is changed such that the pressure of the compressed air supplied into the guide pipe 22 becomes higher than the pressure of the currently supplied compressed air by a predetermined value or by a predetermined percentage. That is, with the current pressure of the compressed air, the wire electrode 12 does not extend straight downward, and is caught on the inner wall of the guide pipe 22, or cannot be passed into the start hole wa or the machining groove wb of the workpiece W and the tip of the wire electrode abuts against the workpiece W. Therefore, the pressure of the compressed air supplied is increased.

Since the feed roller 20 rotates in the normal direction at Step S4, the wire electrode 12 is fed downward again, and it is again determined at Step S5 whether or not the auto wire feeding has succeeded. At this time, if the deflection has not been detected by the deflection detector 38 until the wire electrode 12 is fed downward by the length of the rewound portion (second predetermined length) and the tension detector 42 has detected a tension equal to or higher than the threshold, then the controller 36 determines at Step S5 that the auto wire feeding has succeeded.

If it is determined at Step S5 that the auto wire feeding has failed, the control proceeds again to Step S6, and if it is determined that the auto wire feeding has succeeded, the control proceeds to Step S8. When the auto wire feeding is successful, the wire electrode 12 has reached the winding roller 28, and hence is wound up by the winding roller 28. As a result, a predetermined tension is applied to the wire electrode 12.

At Step S8, the controller 36 updates the data stored in the database 34, based on the result of the successful auto wire feeding. More specifically, in the case that the auto wire feeding has been successful by changing the setting of the pressure of compressed air, from among the data stored in the database 34, the pressure information stored in association with the rigidity information of the wire electrode 12 fed to the workpiece W is updated (changed) to the pressure information of the pressure whose setting has been just changed. In this way, it is possible to store appropriate pressure information conforming to the rigidity information of the wire electrode 12. Alternatively, if the rigidity information of the wire electrode 12 being fed to the workpiece W and the associated pressure information are not found in the database 34, new data may be added based on the result of successful auto wire feeding.

If auto wire feeding has been successfully done without changing the pressure setting of compressed air, it is not necessary to update the data stored in the database 34. This is because, in this case, the data does not change even if it is updated. Further, when updating the data, the pressure information corresponding to the rigidity information different from that of the wire electrode 12 being currently fed to the workpiece W may also be changed. For example, the pressure information corresponding to the rigidity information that is close to the rigidity of the wire electrode 12 being currently fed to the workpiece W may be changed. In the above embodiment, whether the auto wire feeding has succeeded or failed is judged based on both the deflection and the tension of the wire electrode 12. However, it may be determined based on only one of them.

As has been described heretofore, the wire electrical discharge machine 10 according to the embodiment includes the feed roller 20, the winding roller 28, the guide pipe 22, the compressed air supply device 30, the database 34, and the controller 36. The feed roller 20 feeds the wire electrode 12 downward to the workpiece W. The winding roller 28 winds up the wire electrode 12 that has passed through the workpiece W. The guide pipe 22 is arranged in a path along which the wire electrode 12 is fed from the feed roller 20 toward the workpiece W, and formed with the insertion hole 22a through which the wire electrode 12 is inserted. The compressed air supply device 30 supplies compressed air to the insertion hole 22a so that compressed air flows through the insertion hole 22a along the feed direction of the wire electrode 12. The database 34 stores data indicating the relationship between the rigidity information of the wire electrode 12 and the pressure information of compressed air. The controller 36 sets the pressure of the compressed air to be supplied to the insertion hole 22a, based on the rigidity information of the wire electrode 12 fed to the workpiece W and the data stored in the database 34.

Thus, it is possible to supply compressed air at an appropriate pressure for the rigidity of the wire electrode 12 to the insertion hole 22a of the guide pipe 22, so that generation of excessive large noise can be suppressed at the time of auto wire feeding. Accordingly, noise generated by the compressed air supply device 30 at the time of auto wire feeding can be suppressed. In addition, since compressed air of an appropriate pressure is supplied to the insertion hole 22a, the wire electrode 12 can be fed straight downward, and the wire electrode 12 being fed toward the workpiece W can be prevented from bending or undergoing deflection. Owing thereto, it is possible to reliably perform auto wire feeding.

The wire electrical discharge machine 10 further includes the pressure regulating valve 32 that is arranged in the supply pipe 44 connecting the insertion hole 22a and the compressed air supply device 30 and regulates the pressure of the compressed air supplied from the compressed air supply device 30 to the insertion hole 22a. The controller 36 adjusts the diaphragm opening of the pressure regulating valve 32 based on the rigidity information of the wire electrode 12 fed to the workpiece W and the data stored in the database 34 to thereby set the pressure of the compressed air to be supplied to the insertion hole 22a. Accordingly, since the pressure of the compressed air supplied to the insertion hole 22a can be regulated by the pressure regulating valve 32, an air compressor having a relatively small capacity can be used so that noise generated by the compressed air supply device 30 during auto wire feeding can be suppressed.

When determining that auto wire feeding of the wire electrode 12 has failed, the controller 36 changes the setting so that the pressure of the compressed air supplied to the insertion hole 22a becomes higher. Owing thereto, it is possible to change the pressure of the compressed air supplied to the insertion hole 22a to an appropriate pressure for the rigidity of the actually used wire electrode 12, and hence auto wire feeding can be reliably performed.

The wire electrical discharge machine 10 further includes the deflection detector 38 that detects deflection of the fed wire electrode 12. When deflection is detected by the deflection detector 38 at the time of auto wire feeding of the wire electrode 12, the controller 36 determines that the auto wire feeding of the wire electrode 12 has failed. When the auto wire feeding fails, it is considered that the wire electrode 12 is caught on the inner wall of the insertion hole 22a of the guide pipe 22, or the wire electrode 12 is not inserted into the start hole wa or the machining groove wb of the workpiece W but the tip of the wire electrode 12 abuts against the workpiece W, whereby the wire electrode 12 undergoes deflection. Thus, by checking the deflection of the wire electrode 12, it is possible to reliably judge whether the auto wire feeding has succeeded or failed.

The wire electrical discharge machine 10 further includes the tension detector 42 for detecting the tension of the wire electrode 12 fed toward the workpiece W. When a tension equal to or greater than the threshold is not detected by the tension detector 42 at the time of auto wire feeding of the wire electrode 12, the controller 36 determines that the auto wire feeding of the wire electrode 12 has failed. In this way, by checking the tension of the wire electrode 12, it is possible to reliably determine whether the auto wire feeding has succeeded or failed.

In the case where the auto wire feeding has succeeded by changing the setting of the pressure of the compressed air, the controller 36 updates the content of the data stored in the database 34 based on the pressure information for which the auto wire feeding was successful. By performing learning in this way, it is possible to suppress failure of auto wire feeding.

[Modifications]

The above embodiment can be modified as follows.

(Modification 1)

Figure 3:
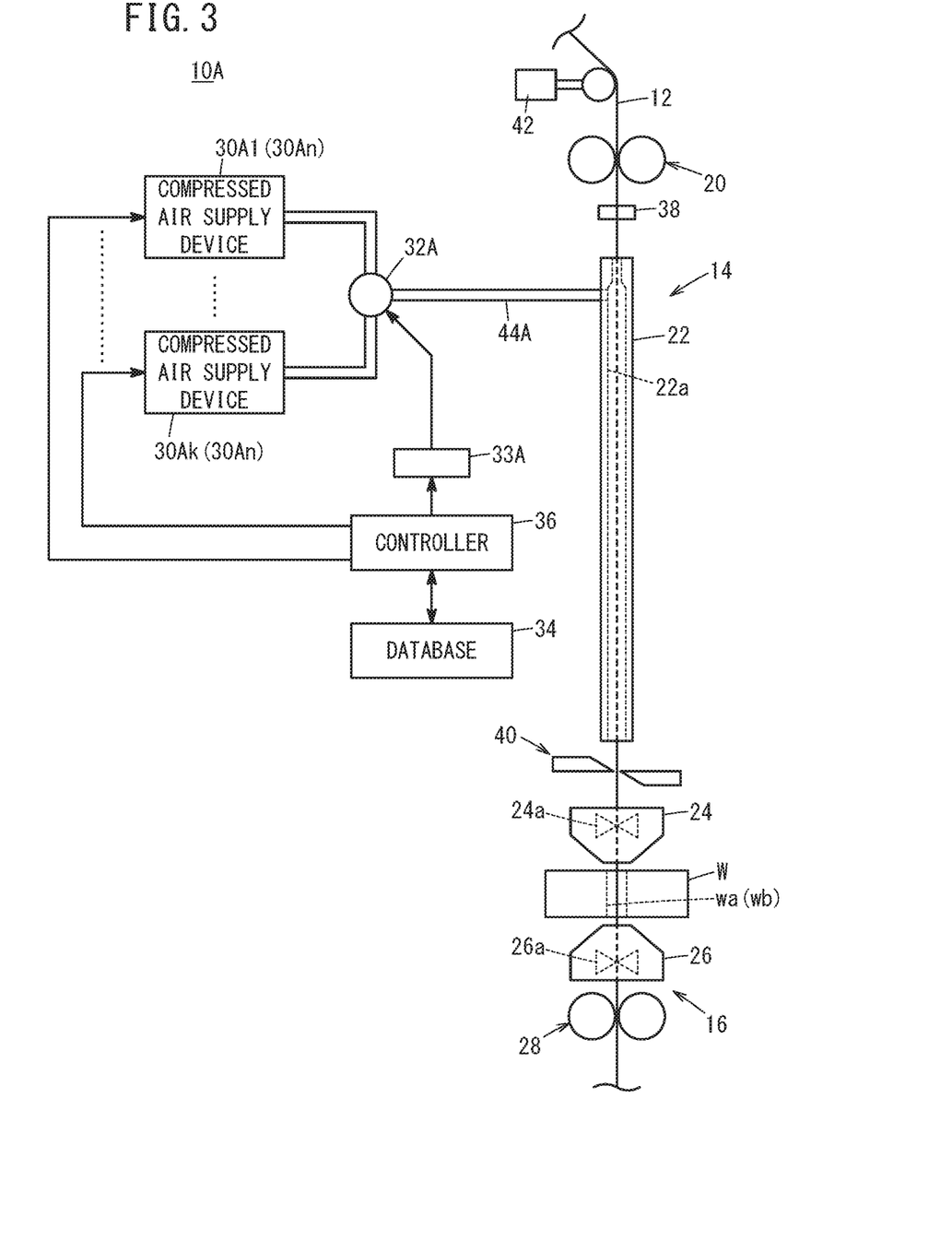

FIG. 3 is a diagram showing a configuration of main components of a wire electrical discharge machine 10A according to Modification 1. Here, the same components with those in the above embodiment are denoted by the same reference numerals, and only the different parts will be explained.

The wire electrical discharge machine 10A of Modification 1 includes, instead of the compressed air supply device 30 and the pressure regulating valve 32, a plurality of compressed air supply devices 30An (n=1, 2, . . . , k) and a switching valve 32A. The plural compressed air supply devices 30An each have an air compressor, generate compressed air of pressures different from each other, and supply the generated compressed air to the insertion hole 22a of the guide pipe 22. In Modification 1, it is assumed that the compressed air supply device 30An having a larger value of n generates compressed air of higher pressure. That is, the pressure of the compressed air generated by the compressed air supply device 30A1 is the lowest, and the pressure of the compressed air generated by the compressed air supply device 30Ak is the highest. In this manner, the compressed air generated by the plural compressed air supply devices 30An is set in a stepwise manner.

Each of the plural compressed air supply devices 30An is connected with the insertion hole 22a via a supply pipe 44A, and the switching valve 32A is provided on the supply pipe 44A. The supply pipe 44A connects the switching valve 32A and the insertion hole 22a, and the switching valve 32A is connected with each of the plural compressed air supply devices 30An. The switching valve 32A is driven by an actuator 33A under the control of the controller 36. The switching valve 32A is a valve that switches between the compressed air supply devices 30An for supplying compressed air to the insertion hole 22a of the guide pipe 22. The switching valve 32A enables one of the plural compressed air supply devices 30An to supply compressed air to the insertion hole 22a of the guide pipe 22.

As the pressure information stored in the database 34 of Modification 1, for example, the pressure values, the identification numbers of the compressed air supply devices 30An for supplying compressed air, or the like are stored, whereas the values of the diaphragm opening are not stored. That is, the pressure values corresponding to the rigidity information on wire electrodes 12, the identification numbers of the compressed air supply devices 30An, or the like are stored.

Figure 2:
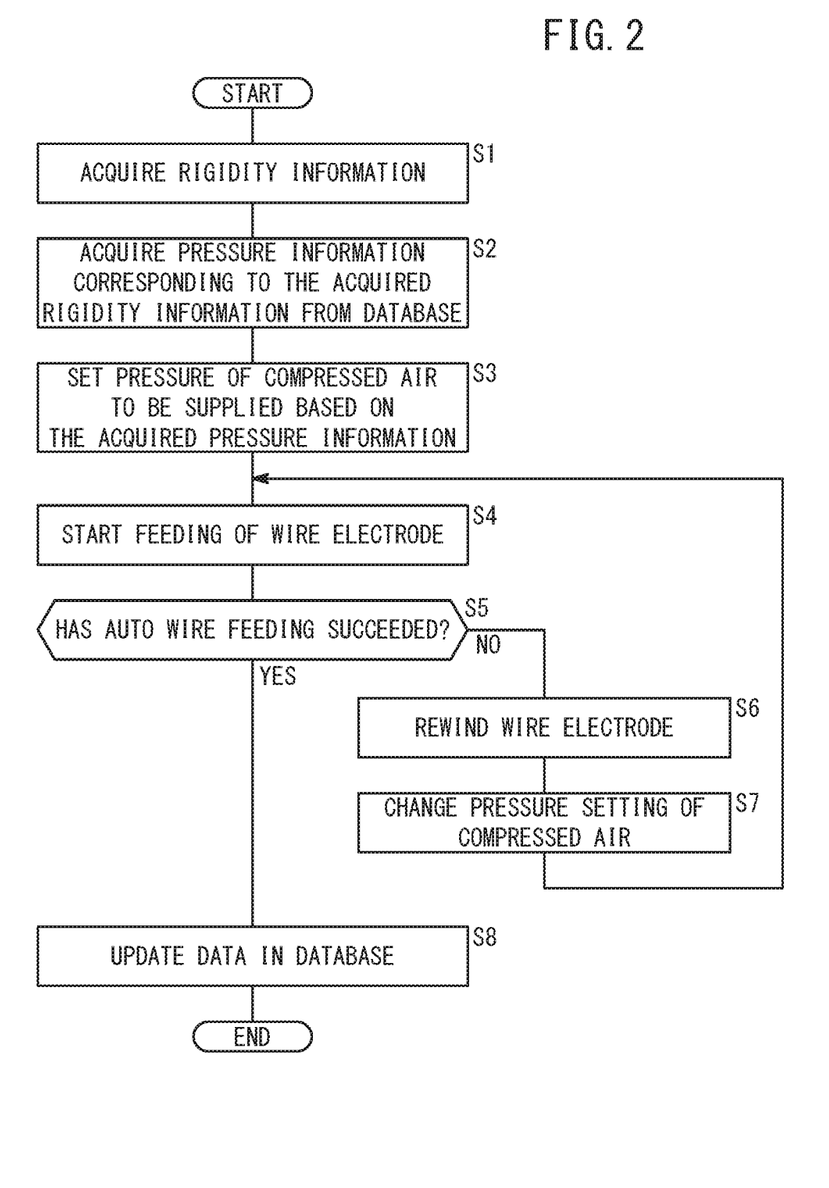
FIG. 2 is a flowchart showing the operation of a wire electrical discharge machine at the time of auto wire feeding; and, FIG. 3 is a diagram showing a configuration of main components of a wire electrical discharge machine of Modification 1.

With reference to FIG. 2, the operation of the wire electrical discharge machine 10A of Modification 1 at the time of auto wire feeding will be described. The controller 36 acquires the rigidity information of the wire electrode 12 input by the operator (Step S1). Then, the controller 36 acquires pressure information of the compressed air from the database 34 based on the rigidity information acquired at Step S1 (Step S2). When pressure information corresponding to the rigidity information acquired at Step S1 is not stored in the database 34, the controller acquires arbitrary pressure information.

Next, the controller 36 sets the pressure of compressed air to be supplied into the guide pipe 22 (insertion hole 22a) based on the acquired pressure information (Step S3). More specifically, the controller 36 puts the compressed air supply device 30An that generates compressed air at a pressure corresponding to the acquired pressure information into an operating state, and controls, at the same time, the switching valve 32A via the actuator 33A so as to supply, into the guide pipe 22, the compressed air generated by the compressed air supply device 30An that is placed in an operating state. In this manner, the pressure of the compressed air supplied into the guide pipe 22 can be set to an appropriate pressure for the rigidity of the wire electrode 12. It should be noted that the controller 36 puts the other compressed air supply devices 30An that will not supply generated compressed air into the guide pipe 22, into a non-operating state. As a result, only one compressed air supply device 30An is put into an operating state so as to generate compressed air to be supplied into the guide pipe 22.

For example, in a case where the compressed air supply device 30An that supplies compressed air of the pressure corresponding to the acquired pressure information is the compressed air supply device 30A1, only the compressed air supply device 30A1 is brought into an operating state while the switching valve 32A is controlled so as to supply compressed air from the compressed air supply device 30A1 into the guide pipe 22.

Next, the controller 36 controls the rotational drive to rotate the feed roller 20 and the winding roller 28 in the normal direction, thereby starting feeding of the wire electrode 12 (Step S4).

Subsequently, the controller 36 determines whether or not the auto wire feeding has succeeded (Step S5). If it is determined at Step S5 that the auto wire feeding has failed, the controller 36 feeds the wire electrode 12 backward (Step S6).

Next, the controller 36 changes the setting of the pressure of the compressed air supplied to the insertion hole 22a of the guide pipe 22 (Step S7), and returns control to Step S4. The controller 36 puts the compressed air supply device 30An currently supplying compressed air into a non-operating state, and puts the other compressed air supply device 30An that generates compressed air of a pressure one step higher, into an operating state. Further, the controller 36 controls the switching valve 32A via the actuator 33A so as to supply the compressed air generated by the newly actuated compressed air supply device 30An to the insertion hole 22a.

For example, when the compressed air supply device 30An that has currently supplied the compressed air is the compressed air supply device 30A1, the controller 36 puts the compressed air supply device 30A1 into a non-operating state, and puts the compressed air supply device 30A2 into an operating state. Further, the controller 36 controls the switching valve 32A so as to supply the compressed air generated by the compressed air supply device 30A2 into the guide pipe 22. In this way, controlling the switching valve 32A makes it possible to change the pressure of the compressed air to be supplied into the guide pipe 22. Though, in the case where auto wire feeding fails, the pressure to be supplied to the insertion hole 22a of the guide pipe 22 is increased by one step, the pressure to be supplied to the insertion hole 22a of the guide pipe 22 may be increased by two, three or multiple steps, at a time.

On the other hand, when it is determined at Step S5 that auto wire feeding has succeeded, the control proceeds to Step S8, and the controller 36 updates the data stored in the database 34 based on the result of the successful auto wire feeding.

As described above, the wire electrical discharge machine 10A of Modification 1 includes the plural compressed air supply devices 30An for supplying compressed air of different pressures from each other, and the switching valve 32A that is provided on the supply pipe 44A connecting the plural compressed air supply devices 30An with the insertion hole 22a and switches the compressed air supply devices 30An for supplying compressed air to insertion hole 22a, from one to another. The controller 36 controls the switching valve 32A based on the rigidity information of the wire electrode 12 fed to the workpiece W and the data stored in the database 34 to thereby set the pressure of compressed air supplied to the insertion hole 22a. In addition, the controller 36 puts one of the compressed air supply devices 30An that supplies compressed air to the insertion hole 22a, into an operating state, and puts the other compressed air supply devices 30An that are not engaged in supplying compressed air to the insertion hole 22a, into a non-operating state.

Thus, since only the compressed air supply device 30An that generates compressed air having an appropriate pressure for the rigidity of the wire electrode 12 is put into an operating state so as to supply the compressed air to the insertion hole 22a, it is possible to suppress generation of needlessly intense noise at the time of auto wire feeding. Thus, the noise generated by the compressed air supply device 30An during auto wire feeding can be suppressed.

(Modification 2)

The above embodiment and Modification 1 may be used in combination. That is, the pressure of the compressed air supplied from each of the plurality of compressed air supply devices 30An may be regulated by the pressure regulating valve 32. In this case, the pressure regulating valve 32 is arranged between the switching valve 32A and the insertion hole 22a. In the case that the pressure of compressed air to be supplied to the insertion hole 22a of the guide pipe 22 is adjusted finely in a stepwise manner, a number of compressed air supply devices 30An are needed. Provision of the pressure regulating valve 32 makes it possible to reduce the number of compressed air supply devices 30An.

While the invention has been particularly shown and described with reference to preferred embodiments, it will be understood that variations and modifications can be effected thereto by those skilled in the art without departing from the scope of the invention as defined by the appended claims.

What is claimed is:

1. A wire electrical discharge machine, comprising:
    a feed roller configured to feed a wire electrode downward to a workpiece;
    a winding roller configured to wind up the wire electrode having passed through the workpiece;
    a guide member arranged in a path along which the wire electrode is fed from the feed roller to the workpiece, and formed with an insertion hole through which the wire electrode is inserted;
    a compressed air supply device configured to supply compressed air to the insertion hole so that the compressed air flows through the insertion hole along a feed direction of the wire electrode;
    a storage medium configured to store data including a table or a graph indicative of a relationship between rigidity information of multiple types of wire electrodes each having different rigidity, and pressure information of the compressed air associated with the multiple types of the wire electrodes;
    a controller comprising a processor configured to control pressure of the compressed air supplied to the insertion hole for auto wire feeding of the wire electrode, based on the data stored in the storage medium, and information relating to rigidity of the wire electrode fed by the feed roller to the workpiece, wherein the information relating to rigidity of the wire electrode being fed by the feed roller to the workpiece is input to the controller by an operator;

a first detector connected to the controller and configured to detect a tension of the wire electrode fed by the feed roller to the workpiece;

a second detector connected to the controller and configured to detect a deflection of the wire electrode fed by the feed roller to the workpiece; and a regulating device connected to the controller, arranged between the compressed air supply device and the insertion hole, and configured to regulate the pressure of the compressed air flowing to the insertion hole under control of the controller, wherein the regulating device comprises a pressure regulating valve arranged in a supply pipe configured to connect the insertion hole with the compressed air supply device, the pressure regulating valve being configured to regulate the pressure of the compressed air supplied from the compressed air supply device to the insertion hole, wherein the processor is configured to adjust a diaphragm opening of the pressure regulating valve based on the information relating to rigidity of the wire electrode fed to the workpiece and the data stored in the storage medium to thereby control the pressure of the compressed air supplied to the insertion hole, wherein the pressure information includes values of the diaphragm opening of the pressure regulating valve associated with the multiple types of the wire electrodes, wherein the processor is configured to make a determination that the auto wire feeding of the wire electrode has failed in response to any of:
  (a) the second detector detects the deflection equal to or greater than a threshold before the wire electrode is fed by a predetermined length, and
  (b) the first detector detects the tension of the wire electrode lower than a further threshold even when the wire electrode is fed by the predetermined length, wherein, in response to the determination that the auto wire feeding of the wire electrode has failed, the processor is configured to change the diaphragm opening of the pressure regulating valve of the regulating device to increase the pressure of the compressed air supplied to the insertion hole by a predetermined value or by a predetermined percentage in a stepwise manner until the processor makes a determination that the auto wire feeding of the wire electrode has succeeded.

2. The wire electrical discharge machine according to claim 1, wherein, in response to the determination that the auto wire feeding has succeeded by increasing the pressure of the compressed air, the processor is configured to update the data stored in the storage medium, based on the pressure information for which the auto wire feeding has succeeded.

3. A wire electrical discharge machine, comprising:

a feed roller configured to feed a wire electrode downward to a workpiece;

a winding roller configured to wind up the wire electrode having passed through the workpiece;

a guide member arranged in a path along which the wire electrode is fed from the feed roller to the workpiece, and formed with an insertion hole through which the wire electrode is inserted;

a compressed air supply device configured to supply compressed air to the insertion hole so that the compressed air flows through the insertion hole along a feed direction of the wire electrode;

a pressure sensor configured to detect pressure of the compressed air supplied to the insertion hole;

a storage medium configured to store data including a table or a graph indicative of a relationship between rigidity information of multiple types of wire electrodes each having different rigidity, and pressure information including pressure values of the pressure of the compressed air associated with the multiple types of the wire electrodes;

a controller connected to the pressure sensor and comprising a processor configured to control the pressure of the compressed air supplied to the insertion hole for auto wire feeding of the wire electrode to have a pressure value, as detected by the pressure sensor, based on the data stored in the storage medium, and information relating to rigidity of the wire electrode fed by the feed roller to the workpiece, wherein the information relating to rigidity of the wire electrode being fed by the feed roller to the workpiece is input to the controller by an operator;

a first detector connected to the controller and configured to detect a tension of the wire electrode fed by the feed roller to the workpiece;

a second detector connected to the controller and configured to detect a deflection of the wire electrode fed by the feed roller to the workpiece; and a regulating device connected to the controller, arranged between the compressed air supply device and the insertion hole, and configured to regulate the pressure of the compressed air flowing to the insertion hole under control of the controller, wherein the regulating device comprises a pressure regulating valve arranged in a supply pipe configured to connect the insertion hole with the compressed air supply device, the pressure regulating valve being configured to regulate the pressure of the compressed air supplied from the compressed air supply device to the insertion hole, wherein the processor is configured to adjust a diaphragm opening of the pressure regulating valve based on the information relating to rigidity of the wire electrode fed to the workpiece and the data stored in the storage medium to thereby control the pressure of the compressed air supplied to the insertion hole, wherein the processor is configured to make a determination that the auto wire feeding of the wire electrode has failed in response to any of:
  (a) the second detector detects the deflection equal to or greater than a threshold before the wire electrode is fed by a predetermined length, and
  (b) the first detector detects the tension of the wire electrode lower than a further threshold even when the wire electrode is fed by the predetermined length, and wherein, in response to the determination that the auto wire feeding of the wire electrode has failed, the processor is configured to change the diaphragm opening of the pressure regulating valve of the regulating device to increase the pressure of the compressed air supplied to the insertion hole by a predetermined value or by a predetermined percentage in a stepwise manner until the processor makes a determination that the auto wire feeding of the wire electrode has succeeded.

* * * * *